STEERING WHEEL

Filed Aug. 1, 1922   3 Sheets-Sheet 1

Inventor
Jay G. Williamson
By Lancaster and A. Levine
Attorneys

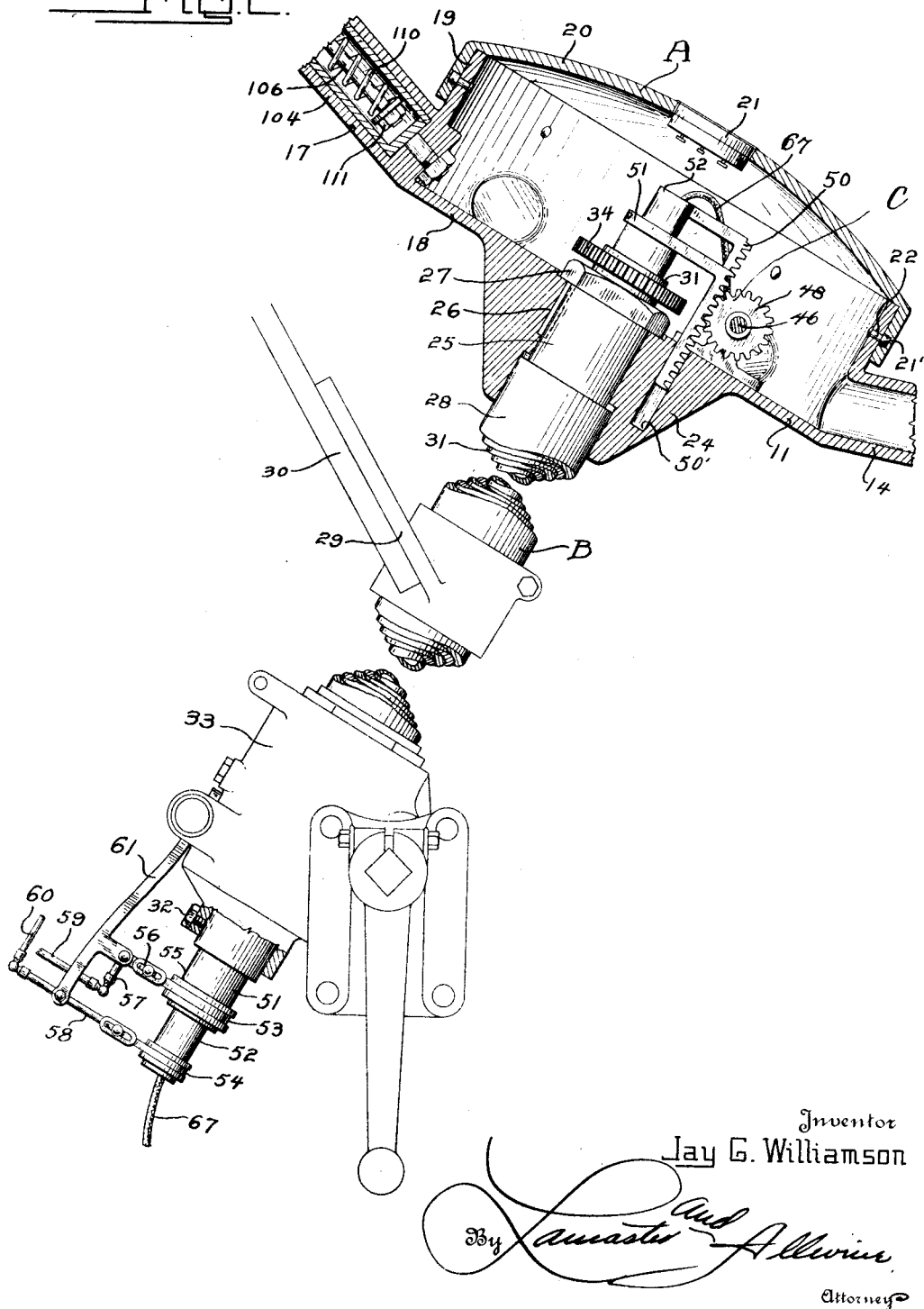

Oct. 21, 1924.  
J. G. WILLIAMSON  
STEERING WHEEL  
Filed Aug. 1, 1922  
1,512,072  
3 Sheets-Sheet 3

Inventor  
Jay G. Williamson  
By Lancaster and Allwine  
Attorneys

UNITED STATES PATENT OFFICE.

JAY G. WILLIAMSON, OF EASTMAN, GEORGIA.

STEERING WHEEL.

Application filed August 1, 1922. Serial No. 579,042.

*To all whom it may concern:*

Be it known that I, JAY G. WILLIAMSON, a citizen of the United States, residing at Eastman, in the county of Dodge and State of Georgia, have invented certain new and useful Improvements in Steering Wheels, of which the following is a specification.

This invention relates to steering and controlling devices for motor vehicles and the primary objects of the invention are to provide in a novel steering wheel first, means whereby the entrance and exit of the operator to and from the operator's seat will be facilitated; second, means whereby the spark and gas control mechanisms of the motor can be readily operated; and third, means whereby the steering mechanism can be locked against movement by unauthorized persons.

Another object of the invention is to provide a novel steering wheel embodying novel controlling mechanism for the spark and throttle of the motor, whereby the said spark and throttle mechanism can be conveniently manipulated by the hands of the operator without the necessity of removing the hands from the steering wheel or the feet from the brake and clutch pedals, thereby permitting the successful simultaneous manipulation of the spark and throttle mechanism, the steering gear of the vehicle and the brake and clutch pedals.

A further object of the invention is the provision of a novel steering wheel having hand grips rotatably carried by the rim of the wheel and novel means for connecting the rotatable grips with the spark and throttle mechanism of the motor.

A further object of the invention is to provide a novel means for normally holding the hand grips against accidental rotation, so that movement of the hand grips during the turning of the steering wheel will be normally prevented.

A further object of the invention is to provide a novel operating means disposed within the casing of the steering post operatively connected with the spark and throttle mechanisms of the motor, the said operating means being connected in a novel manner with the hand grips, whereby the slightest movement of the hand grips will impart movement to said operating means.

A further object of the invention is to provide a novel cover or dome carried by the steering wheel for normally housing the operating mechanism, the said dome having novel means for locking the same in place against opening movement by unauthorized persons, the said locking means also forming means for preventing the rotation of the steering wheel by unauthorized persons, when so desired.

A further object of the invention is to provide a novel lock carried by the hub of the steering wheel for engagement with a stationary portion of the steering post, said locking means being adapted to engage the stationary portion of the post irrespective of the position of the steering wheel, said locking means including novel mechanism for withdrawing and forcing the locking bolt into place.

A further object of the invention is the provision of a novel steering wheel embodying a main section and a hinged section connected with the main section, the hinged section being so arranged that the same can be swung downward at right angles to the main section in order to facilitate the entrance and exit of the operator to and from the operator's seat.

A further object of the invention is to provide a novel means for rigidly holding the hinged section in operative position in relation to the main section so that the steering wheel can be readily and conveniently turned.

A still further object of the invention is to provide an improved steering wheel for a motor vehicle of the above character, which will be durable and efficient in use, one that will be simple and easy to manufacture, and one which can be placed upon the market at a reasonable cost.

With these and other objects in view the invention consists in the novel construction, arrangement and formation of parts, as will be hereinafter more specifically described, claimed and illustrated in the accompanying drawings, forming a part of this specification, in which drawings:

Fig. 2 is an enlarged vertical section through the improved steering mechanism showing only the hub portion of the steering wheel.

Fig. 5 is an enlarged fragmentary horizontal section through the hub of the steering wheel, showing the novel lock carried thereby in position for locking both the steering wheel against movement and the cover against removal.

Fig. 6 is an enlarged longitudinal section through one of the spokes of the steering wheel showing the novel means for connecting the hinged section of the wheel to the main section of the wheel.

Figure 1:
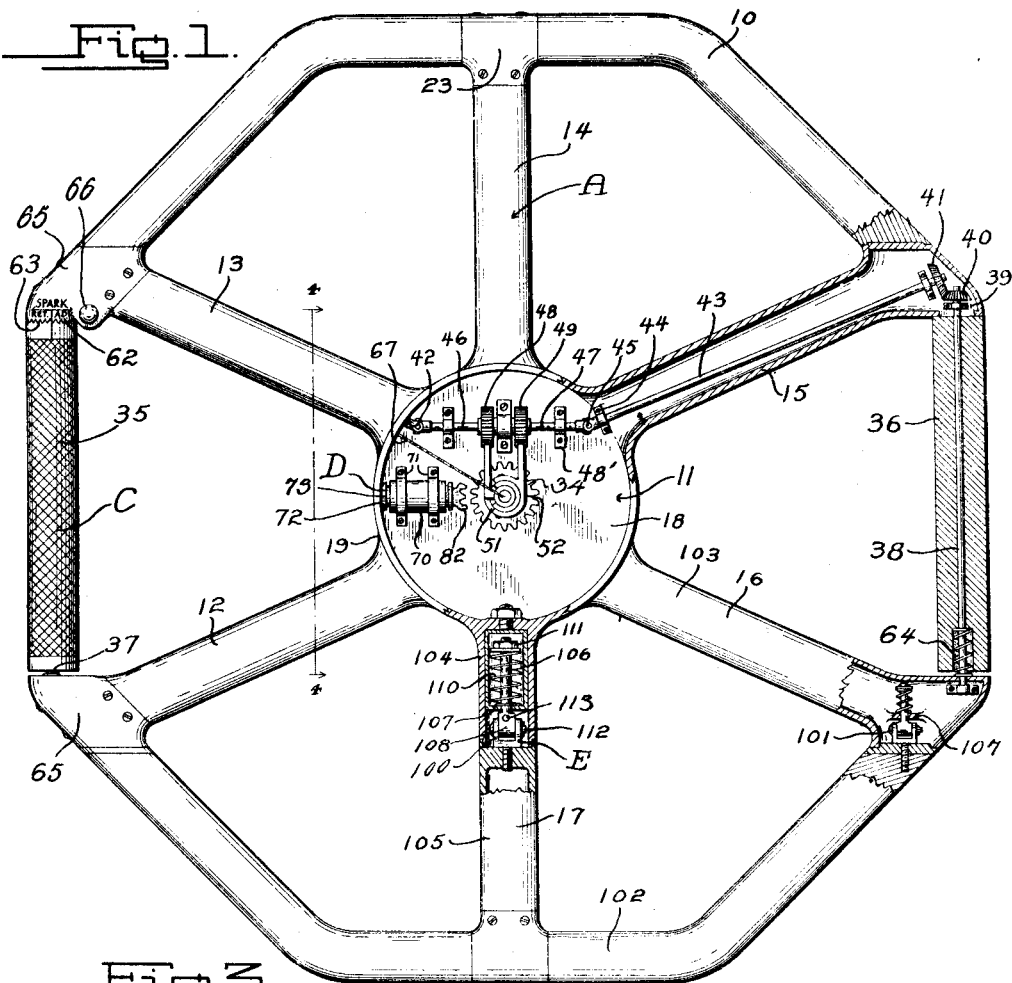
Figure 1 is a top plan view of the improved steering wheel showing parts thereof in section and the dome or cover for the hub of the wheel removed therefrom.
Figure 3:
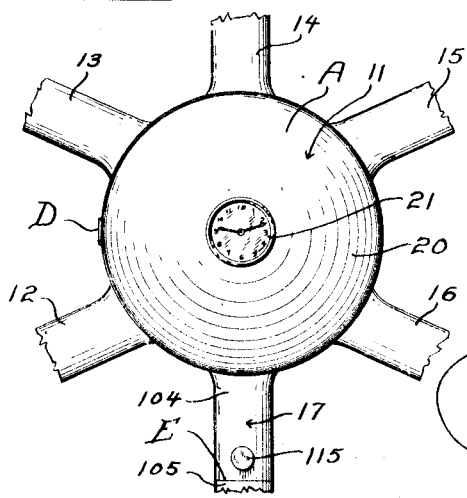
Fig. 3 is a fragmentary top plan view of the improved steering wheel showing the dome or cover in position.
Figure 4:
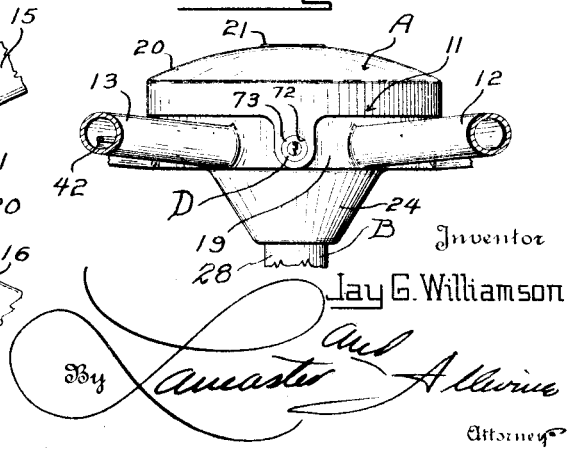
Fig. 4 is a detail vertical section taken on the line 4—4 of Figure 1, showing the hub of the steering wheel in side elevation.

Referring to the drawings in detail, wherein similar reference characters designate corresponding parts throughout the several views the letter A generally indicates the improved steering wheel; B the steering post; C the novel means for controlling the spark and throttle mechanisms of the motor; D the novel means for locking the steering wheel against steering movement by unauthorized persons and for holding the cover or dome against removal, and E. the novel means for permitting the swinging of a portion of the wheel downward to facilitate the entrance to or the exit from the operator's seat of the vehicle.

The improved steering wheel A is of a substantial octagon configuration and can be formed of wood and metal or wholly of metal. As shown the same includes the rim 10 which is preferably formed of wood, the metallic hub 11 and the connecting hollow metallic tubular spokes 12, 13, 14, 15, 16 and 17. As shown the spokes 12, 13, 15 and 16 extend from the hub 11 to certain apex portions of the rim while the arms 14 and 17 extend to the rim to points intermediate the apex portions thereof. These spokes 14 and 17 are disposed diametrically opposite each other.

The hub 11 is of a novel configuration in order to form a suitable housing for the various operating mechanisms of the improved steering and controlling device and for the lock D for holding the steering wheel against turning movement. This hub 11 includes a flat disc shaped base or bed plate 18 and an upstanding annular wall 19 from which the spokes radially extend. This side wall 19 is adapted to support the removable dome or cover 20 which prevents unauthorized persons from tampering with the mechanism of the steering and controlling device. The axial center of the dome 20 is provided with a clock 21 having illuminous dial so that the operator of the machine can readily see the time of the day without the necessity of withdrawing his watch from his pocket or looking on the instrument board of the vehicle.

This dome is provided with suitable bayonet slots 21' at spaced points which are adapted to receive radially extending pins 22 carried by the side wall 19. This effectively holds the dome in position and the lock D which will be hereinafter more fully described prevents the removal of the dome by unauthorized persons.

The spokes 12, 13, 14, 15, 16 and 17 have their inner ends preferably integrally connected with the hub 11 and can be cast therewith if desired. The outer ends of the spokes are connected by means of suitable cuffs 23 to the rim. A depending axial enlargement 24 is formed on the hub 11 and receives the hollow shaft 25 which is operatively connected in any preferred manner to the steering mechanism. As shown the enlargement 24 is keyed as at 26 to the shaft 25 and the upper end of the shaft is threaded for the reception of a suitable nut 27. This shaft 25 is of course rotatably mounted within the usual stationary post 28, which can be secured in any preferred manner as at 29 to a stationary portion 30 of the motor vehicle. Disposed within the rotatable shaft 25 is a stationary shaft or sleeve 31 which is secured as at 32 against rotation to the housing 33 of the gears utilized for transmitting motion from the rotatable shaft 25 to the ground steering wheels of the vehicle. The upper end of this shaft or sleeve 31 has rigidly secured thereto a stationary gear wheel 34 which forms a part of the lock mechanism D, which will be hereinafter more fully described.

The controlling means C for the spark and throttle mechanism of the motor includes a hand grip 35 for the spark and a hand grip 36 for the throttle. These hand grips 35 and 36 are interposed in the rim 10 of the steering wheel A and are slidably mounted on and non-rotatably connected to shafts 37 and 38. These shafts 37 and 38 are mounted in suitable bearings 39 carried by the terminals of the spokes 12, 13, 15 and 16 and the forward terminals of these shafts 37 and 38 have keyed or otherwise secured thereto beveled pinions 40 which in turn mesh with beveled pinions 41 keyed or otherwise secured to the inwardly extending shafts 42 and 43 which are disposed within the spokes 13 and 15. These shafts 42 and 43 are mounted within suitable bearings 44 carried by the hub and disposed adjacent to the mentioned spokes. The inner terminals of these shafts 42 and 43 are extended within the hub 11 of the wheel A and are connected by suitable knuckle joints 45 with stub shafts 46 and 47 which are mounted within suitable bearings 48' disposed within the hub. These shafts 46 and 47 have secured thereto in any preferred manner pinions 48 and 49 which mesh with rack bars 50 carried by concentrically disposed sliding shafts 52 and 51. These rack bars 50 are mounted in independent wells 50' formed in the enlargement 24 of the hub. These shafts 51 and 52 are disposed within the stationary shaft or sleeve 31 and it can be seen that upon rotation of the hand grips 35 and 36 that the sliding shafts 52 and 51 will be raised or lowered according to the direction of movement of the said hand grips. The lower terminals of the sliding shafts 51 and 52 have rotatably mounted thereon collars 53 and 54 which are confined in position against displacement from said shafts by means of holding rings 55, which are rigidly secured to said shafts 51 and 52. Each of the collars 53 and 54 are connected through the medium of links 56 to cranks and levers 57 and 58 which are in turn connected with the ordinary operating rods 59 and 60 of the throttle and spark control mechanisms for the motor. The cranks and levers 57 and 58 are pivotally secured intermediate their ends by suitable supporting arm 61 which is rigidly secured to gear case 33.

The outer surface of the hand grips 35 and 36 can be suitably serrated in order that a firm grip can be obtained thereon by the operator of the vehicle and in order to hold the hand grips against accidental rotation the forward terminals thereof are provided with suitable teeth 62 which are adapted to mesh with teeth 63 formed on the means for connecting the spokes 13 and 15 with the rim. The hand grips 35 and 36 are normally urged forward to maintain the teeth 62 in engagement with the teeth 63, by means of suitable expansion springs 64 which are coiled about the shafts 37 and 38 and engage respectively against the hand grips and spokes 12 and 16. It can be seen that when it is desired to operate the spark and gas mechanism the hand grips 35 and 36 are turned and the intermeshing teeth 62 and 63 will make the feeding more accurate, as the operator will feel the movement of the teeth slipping past each other in turning the hand grips.

It is preferred to provide cover plates 65 at the terminals of the spokes 12, 13, 15 and 16 so that access can be readily had to the interior of the rim and spokes at the terminals of the hand grips 35 and 36 so as to facilitate the placing of the hand grips into position and oiling the gears 40 and 41. The cover plate 65 located at the forward end of the hand grip 35 can carry the signal horn button 66 and thus it can be seen that the horn can be manipulated directly from the rim of the steering wheel without the necessity of removing the hand from the steering wheel. The wire 67 for the button is extended through the hollow spoke 13 and through the inner shaft 52.

The locking means D utilized for holding the dome 20 against removal by unauthorized persons, and for preventing turning movement of the steering wheel A by unauthorized persons when the automobile is parked, includes a casing 70 disposed within the hub 11 and secured to the plate 18 thereof by suitable brackets or the like 71. This casing 70 non-rotatably, but slidably supports the barrel 72 of a cylinder lock 73 which can be of any preferred character, such as a Yale lock. The barrel 72 has rotatably mounted therein in the usual manner the plug 74 which carries the tumblers 75 that are normally engaged by spring pressed drivers 76 carried by the barrel. It is apparent that when the correct key is inserted in the key way in the plug 74 that rotary movement of the plug 74 in relation to the barrel 72 will be permitted. The inner end of the plug 74 has secured thereto in any preferred manner a rod 77 which is provided with relatively coarse or steep pitched threads 78 which engage similar internal threads 79 formed within the sliding chamber 80 that is also mounted within the casing 70. This sliding chamber 80 supports a sliding bolt 81 which carries the toothed segment head 82, that is adapted to normally engage the gear wheel 34, heretofore mentioned, that is keyed or otherwise secured to the non-rotatable shaft 31. Outward movement of the bolt 81 within the casing is limited by the stop flange 83 formed thereon. An expansion spring 84 is housed within the chamber 80 and engages the inner end of the bolt 81 and the inner end of the rod 77 and normally tends to urge the head 82 into engagement with the gear wheel 34. A second expansion spring 85 is provided and this spring is disposed within the housing 70 and engages respectively the inner end of the housing 70 and suitable pins 86 carried by the inner end of the barrel 72 of the cylinder lock 73. The forward end of the chamber 80 is also provided with a stop flange 88. The forward end of the barrel 72 normally projects through the wall 19 of the hub 11 and through the dome 20, suitable openings 89 and 90 being formed in the wall and dome, therefor.

In use of said lock, when it is desired to unlock the steering wheel to permit movement thereof, the key is inserted into the key way of the plug 74 of the cylinder lock and a complete revolution is given to the key in a clockwise direction which will draw the chamber 80 inwardly and move the head 82 from out of engagement with the gear wheel 34. And now movement of the steering wheel is permitted. If it is desired to remove the dome 20 for any reason, a second revolution is given the plug in the same direction and in view of the fact that the stop flange 88 will be in engagement with the forward end of the casing 72 will be drawn out of the opening 90 into the casing 70 and thereby permit movement of the dome.

When it is desired to lock the dome and the steering wheel against movement rotation is imparted to the plug of the cylinder lock in a reverse direction which will first push the barrel 72 into opening 90 and then slide the chamber 80 toward the gear wheel inwardly of the casing 70. These two actions are caused to occur in the order mentioned by the expansion spring 85. If the teeth of the gear wheel 34 and the teeth of the segment head 82 do not mesh it will be seen that the chamber 80 will still be permitted to move inwardly owing to the spring 84 and as soon as movement is imparted to the wheel 34 the spring 84 will force the teeth of the head 82 in between the teeth of the gear wheel 34.

The means E for permitting the collapsing of the steering wheel so as to facilitate the entrance to and the exit from the driving seat of the vehicle includes a novel central joint 100 and end joints 101, these joints 100 and 101 connect the smaller section 102 of the wheel to the larger sections 103 thereof. The smaller section 102 is disposed at the rear portion of the steering wheel and is connected at the point of connection with the spokes 12 and 16 of the rim and the spoke 17 is disposed at an intermediate portion of the smaller section 102. In order to permit of swinging movement of the section 102 in relation to the larger section 103 the spoke 17 consists of an inner section 104 which is connected or rigidly secured to the hub 11 in any preferred manner and an outer section 105 which is connected with the rim of the steering wheel or portion 102 thereof by means of the cuffs 23.

The novel joints 100 and 101 are constructed identically the same with the exception that the central joint 100 is formed relatively heavier than the end joints 101.

Each of these joints include a sliding rod 106 which is mounted in suitable guides 107. The outer end of each rod 106 carries a head 108 which is disposed between suitable ears 109 secured to the smaller section 102. Coil springs 110 of the expansion type are coiled about the rods 106 and bear respectively against the guides 107 and suitable stops such as nuts 111 carried by the inner ends of the rods. The heads 108 are connected to the ears 109 by suitable pivot pins 112. The terminals of the small section 102 and the terminal of the section 105 of the spoke 17 are fitted within the terminals of the larger section 103 of the steering wheel and in the section 104 of the spoke 17.

Now when it is desired to swing the sections 102 of the steering wheel A downward and spoke section 105 from out of engagement with the spoke section 104 and the larger section 103 of the steering wheel which will then permit the section 102 to be swung downward. This will permit free exit to be had from the operator's seat.

When it is desired to swing the section 102 back to its normal position the same is merely raised and when the terminals of the section 102 and the spoke section 105 come into alignment with the terminals of the steering wheel section 103 and with the spoke section 104 the same will be automatically drawn back to its normal position by the expansion springs 110.

In order to eliminate the accidental movement of the steering wheel section 102 the central rod 106 has the head 108 thereof provided with an opening 113 which is adapted to receive a sliding locking pin 114, which is extended outwardly of the section 104. This pin is provided with a head 115 to permit the easy manipulation of the said pin. In order to hold the locking pin 114 in its raised position, to permit the manipulation of the section 102 by both hands, a second pin 116 is carried by the head 115 and is adapted to be received in a suitable socket 117 carried by the spoke section 104. When the pin 114 is raised, the same is turned slightly, which will position the pin 116 in engagement with the outer surface of the spoke and permit the pin 114 to be held in its raised position. The pin 114 is normally urged into engagement with the opening or socket 113 by means of an expansion spring 118 which is coiled about the pin 114 and has its terminals engaging respectively the inner spoke section 104 and against a suitable washer or pin 119 carried by the pin 114. When this pin 114 is in engagement with the wall of the opening 113 sliding movement of the smaller steering wheel section 102 is of course eliminated.

From the foregoing description it can be seen that an improved steering wheel has been provided which embodies means for preventing turning of the steering wheel by unauthorized persons; means for controlling the spark and throttle of the motor from the rim of the wheel, and means for permitting a portion of this wheel to be swung downwardly clear of the operator to facilitate the entrance of the operator to and the exit of the operator from the operator's seat.

Changes in details may be made without departing from the spirit or scope of this invention; but,

I claim:

1. In a steering and controlling mechanism for motor vehicles, a steering post, a steering wheel rotatably carried by the post, a steering shaft rotatably mounted in the post and connected with the wheel, concentrically disposed spark and throttle controlling sleeves disposed within the steering shaft, and rotatable hand grips interposed in the rim of the steering wheel and operatively connected to said spark and throttle controlling sleeves.

2. In a steering and controlling means for motor vehicles a steering post, a rotatable steering hollow shaft rotatably mounted within said post, and a steering wheel secured to the shaft including a hollow hub, a rim and hollow connecting spokes for the rim and hub, rotatable hand grips interposed in the rim, sliding spark and throttle operating sleeves mounted within the hollow steering shaft, and means extending through the hollow spokes and hub for operatively connecting the hand grips with the sliding spark and throttle operating sleeves.

3. In a steering and controlling mechanism for motor vehicles including a steering post, a hollow tubular steering shaft rotatably mounted within said post, concentrically disposed hollow sliding spark and throttle controlling sleeves mounted within said hollow steering shaft, a steering wheel rotatably carried by the post, and rigidly connected with the steering shaft and including a rim, a hollow hub, and radially extending tubular spokes, rotatable hand grips interposed in the rim between certain of the spokes, stub shafts rotatably mounted within the hollow hub, rotatable shafts carried by certain of the spokes and operatively connected with the hand grips and with the stub shafts, a rack bar carried by each of the sliding sleeves and pinions keyed to said stub shafts for engaging said rods.

4. In a steering and controlling mechanism for motor vehicles, a hollow steering post, a hollow tubular steering shaft rotatably mounted within said post, a steering wheel rotatably carried by the post and rigidly secured to the hollow steering shaft, a pair of concentrically disposed tubular sliding spark and throttle controlling sleeves mounted within said shaft, said steering wheel including a hollow hub and a rim, and tubular spokes connecting the rim and hub together, collars rotatably mounted upon the lower terminals of said sleeves for sliding movement therewith, levers rockably secured to the post, links connecting the sliding collars with said levers, a pair of stub shafts rotatably mounted in the hub for independent movement, shafts rotatably mounted in certain of the tubular spokes, knuckle joints connecting said last mentioned shafts with the outer ends of the stub shafts, rotatable hand grips interposed in the rim of the wheel and disposed adjacent to the spokes carrying said shafts, beveled pinions connecting the hand grips with the outer ends of the shafts disposed in said spokes, vertically disposed rack bars secured to each of the sliding sleeves and pinions secured to the stub shafts meshing with said rack bars.

5. In a steering and controlling device for motor vehicles, a rotatable steering wheel including a rim, a hollow hub, and hollow spokes connecting the hub with the rim, rotatable shafts interposed in the rim at diametrically opposite points, rotatable shafts disposed in certain of the spokes, beveled pinions operatively connecting the shafts together, means connecting the shafts in the spokes with the spark and throttle control mechanisms of the motor, hand grips slidably mounted upon the shafts interposed in the rim for movement therewith, clutch teeth formed on the rim, clutch teeth formed on the upper ends of the hand grips for engaging the first mentioned clutch teeth for preventing accidental rotary movement of the hand grips, and expansion springs coiled about said shafts interposed in the rim for normally urging the hand grips toward the clutch teeth carried by said rim.

JAY G. WILLIAMSON.